3,000,853
THERMOPLASTIC COMPOSITIONS HAVING
IMPROVED LIGHT STABILITY
Carl B. Havens, Hope, Mich., assignor to The Dow
Chemical Company, Midland, Mich., a corporation of
Delaware
No Drawing. Filed Dec. 24, 1956, Ser. No. 630,073
1 Claim. (Cl. 260—45.95)

This invention relates to new and improved thermoplastic compositions. More particularly, it relates to polymeric compositions having improved stability to the degradative effects of light.

Thermoplastic compositions, particularly those prepared from haloethylene polymers, have found wide acceptance as useful materials for making foils, fibers, filaments, and other articles. The articles so produced are inherently strong, dimensionally stable, relatively inert to common household solvents, and are easily colored for an attractive appearance. However, such articles are subject to rapid and severe degradation and consequent discoloration due to the effects of heat and light. The problem becomes most serious when polymeric compositions are employed as filamentary materials in making window curtains, automobile seat covers, and other articles which are exposed for prolonged periods of time to direct sunlight. To overcome this disadvantage it has become most practical to incorporate certain additives into the composition to stabilize it to the effects of heat and to add other materials to the composition to stabilize it to the effects of light. Some of the prior light stabilizing materials have suffered from the disadvantages of bleeding out of articles made from vinyl or vinylidene halides. In addition, some of the materials are colored so that they impart an objectionable initial color which prevents the production of white articles. Further, many of the prior materials lose their effectiveness as light stabilizers after exposure to sunlight for a short time.

It is accordingly an object of this invention to provide improved polymeric compositions having increased resistance to the degradative effects of light.

It is a particular object to provide such a composition which is based on a haloethylene polymer and is resistant to the effects of light over prolonged periods of exposure to direct sunlight.

The above and related objects are achieved with a polymeric composition comprising a haloethylene polymer and stabilizing quantities of a substituted dihydroxy benzophenone having the general formula:

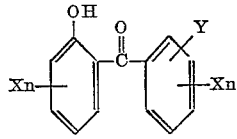

wherein Y is a hydroxyl group located in a position 2' or 4' to the carbonyl group, X is selected from the group consisting of alkyl and halide, and n is a whole number of from 1 to 4. The compositions of this invention show effective resistance to the degradative effects of light even after prolonged exposure.

The haloethylene polymers which are stabilized in accordance with this invention are those having pendant halide groups on the carbon chain. Among those haloethylene polymers may be mentioned the polymers of vinylidene chloride and of vinyl chloride, and the copolymers of vinylidene chloride and vinyl chloride with each other or with another monoethylenically unsaturated monomer, such as acrylonitrile or vinyl acetate. The copolymers consisting predominantly of vinylidene chloride are unusually sensitive to light and those copolymers accordingly are preferred subjects for stabilization.

The substituted dihydroxy benzophenone derivatives useful in this invention are those falling within the above general formula. From that formula it is apparent that each phenyl group must contain one hydroxyl substituent and that at least one of the hydroxyls must be in an ortho position to the carbonyl with the other hydroxyl in either an ortho or a para position. Further the derivatives must contain at least 1 substituent from the group alkyl and halide and may contain as many as 8 such substituents. The stabilization effectiveness of the derivatives is independent of the position of the alkyl or halide substituents. The derivatives are easily prepared from readily available materials by conventional laboratory procedures. Typically an ester may be prepared from the correspondingly substituted salicylic acid and phenol and then rearranged thermally in the presence of aluminum chloride. A second method is the direct chlorination of the 2,2'- or 2,4'-derivative at about 70 degrees C. with chlorine gas until a predetermined weight gain has been observed. The latter method provides compounds having the halide groups in various positions and such mixtures of compounds are suitable stabilizers without further purification. For purposes of this application such mixtures will be referred to as X-mono- or di- or poly-chlorobenzophenone derivatives.

The derivatives of this invention may be employed in a concentration of from 0.5 to 5 percent by weight based on the weight of the polymer, and preferably in a concentration of from 1 to 3 percent by weight. When less than 0.5 percent is used there is little stabilization noticed. No beneficial results are apparent from the use of more than 5 percent. Most polymeric compositions comprise many ingredients such as plasticizers, fillers, pigments, and heat stabilizers and the dihydroxy benzophenone derivatives may be employed in the compositions in conjunction with such additives without any adverse effects. Likewise, the derivatives of this invention may be used in conjunction with other known light stabilizers.

The ingredients may be intermixed by milling or blending in conventional manner. It is only important that the stabilizer be uniformly distributed throughout the composition.

The compositions of this invention show superior resistance to degradation due to exposure to light over previously known compositions. This superiority will be more apparent from the following illustrative example in which all parts and percentages are by weight.

*Example*

A series of samples was made from a basic formulation consisting of 92 parts of a copolymer prepared from 85 percent vinylidene chloride and 15 percent vinyl chloride, 7 parts of acetyl triethyl citrate as a plasticizer, and 1 part of tetrasodium pyrophosphate as a heat stabilizer. One of the samples was left unstabilized as a blank and some samples contained 2-hydroxy-5-chlorobenzophenone for comparative purposes. Other samples contained various amounts of the stabilizers of this invention. The ingredients were blended and molded into test specimens having a thickness of 0.01 inch. The specimens were exposed to direct sunlight in the State of Florida for 3 months and examined and rated for discoloration. The results are listed in the following table.

| Stabilizer | Percent Stabilizer | Color After Exposure |
|---|---|---|
| For Comparison: | | |
| None | | dark brown. |
| 2-hydroxy-5-chlorobenzophenone | 1.0 | brown. |
| Do | 2.0 | Do. |
| Stabilizers Of This Invention: | | |
| X-monochloro-2,2'-dihydroxybenzophenone | 1.0 | tan. |
| X,X-dichloro-2,2'-dihydroxybenzophenone | 1.0 | Do. |
| X-monochloro-2,4'-dihydroxybenzophenone | 1.0 | Do. |
| 5,5'-dichloro-2,2'-dihydroxybenzophenone | 1.0 | Do. |
| 5-methyl-2,2'-dihydroxybenzophenone | 3.0 | Do. |

The derivatives of this invention show considerably more stabilizing effectiveness toward haloethylene polymers than the known stabilizer.

Similar results are observed when the derivatives of this invention are used with the polymers and copolymers of vinyl chloride.

I claim:

A light stable composition comprising a polymeric vinylidene chloride product and stabilizing quantities of a substituted dihydroxy benzophenone derivative having the general formula

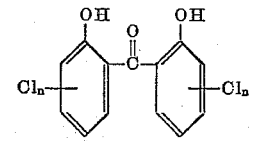

wherein $n$ is a whole number of from 1 to 4 and wherein said derivative is prepared by the direct chlorination of 2,2'-dihydroxy benzophenone.

References Cited in the file of this patent

UNITED STATES PATENTS

| | | |
|---|---|---|
| 2,264,291 | Boyer | Dec. 2, 1941 |
| 2,659,709 | Daglish et al. | Nov. 17, 1953 |
| 2,675,411 | Caldwell | Apr. 13, 1954 |
| 2,819,247 | Lundberg | Jan. 7, 1958 |